US009334055B2

(12) United States Patent
Smith et al.

(10) Patent No.: US 9,334,055 B2
(45) Date of Patent: May 10, 2016

(54) METHOD AND APPARATUS FOR ATTACHING A TRIM TO A COVER OF A BIN ASSEMBLY

(71) Applicant: The Boeing Company, Chicago, IL (US)

(72) Inventors: James Brannon Smith, Mill Creek, WA (US); Lee Alan Beldock, Davisburg, MI (US); Asim Chadha, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/186,048

(22) Filed: Feb. 21, 2014

(65) Prior Publication Data
US 2015/0102167 A1 Apr. 16, 2015

Related U.S. Application Data

(60) Provisional application No. 61/891,618, filed on Oct. 16, 2013.

(51) Int. Cl.
  *F16B 2/20* (2006.01)
  *B64D 11/00* (2006.01)
  *F16B 11/00* (2006.01)

(52) U.S. Cl.
  CPC ............ *B64D 11/003* (2013.01); *F16B 11/006* (2013.01); *F16B 2/20* (2013.01); *Y10T 403/471* (2015.01)

(58) Field of Classification Search
  CPC ....... B64D 11/003; F16B 11/006; F16B 2/20; B60N 2/5825; B60N 2/5841; A47C 31/023; B29C 44/1271; B60J 10/088
  See application file for complete search history.

(56) References Cited

U.S. PATENT DOCUMENTS

| | | | | |
|---|---|---|---|---|
| 8,733,834 B2 * | 5/2014 | Palmer | ................... | B60N 2/585 297/218.1 |
| 2003/0215601 A1 * | 11/2003 | Pedde | ..................... | B29C 33/12 428/102 |
| 2004/0026577 A1 * | 2/2004 | Yasuda | ............... | B60R 16/0215 248/74.3 |
| 2006/0175762 A1 * | 8/2006 | Barnett | .................. | B60J 1/1853 277/551 |
| 2009/0140569 A1 * | 6/2009 | Mashimo | ............. | B60N 2/5825 297/452.59 |
| 2011/0140462 A1 | 6/2011 | Lin et al. | | |
| 2012/0248826 A1 * | 10/2012 | Motomura | ............... | B60J 10/12 296/216.07 |
| 2012/0274116 A1 * | 11/2012 | Palmer | ................... | B60N 2/585 297/396 |
| 2012/0284974 A1 * | 11/2012 | Yamamoto | ........... | A47C 31/023 24/458 |
| 2013/0232881 A1 * | 9/2013 | Adachi | ................ | B60J 10/0005 49/490.1 |
| 2013/0247338 A1 * | 9/2013 | Santin | ....................... | F16B 2/22 24/545 |
| 2014/0033614 A1 * | 2/2014 | Bartolomucci | ...... | B60J 10/0011 49/506 |
| 2014/0090304 A1 * | 4/2014 | Drake | .................... | B60R 13/04 49/501 |

\* cited by examiner

*Primary Examiner* — Valentina Xavier
(74) *Attorney, Agent, or Firm* — Yee & Associates, P.C.

(57) ABSTRACT

A method and apparatus for attaching a trim member for a stowage bin to a structure associated with the stowage bin. A bonding member of an attachment element may be bonded to the trim member. A portion of the structure may be received within a groove formed between the bonding member and a biased member of the attachment element. The portion of the structure may be held in place within the groove by the biased member of the attachment element such that the trim member is attached to the structure.

19 Claims, 11 Drawing Sheets

METHOD AND APPARATUS FOR ATTACHING A TRIM TO A COVER OF A BIN ASSEMBLY

RELATED PROVISIONAL APPLICATION

This application claims the benefit of U.S. Provisional Patent Application Ser. No. 61/891,618, filed Oct. 16, 2013, and entitled "Method and Apparatus for Attaching a Trim to a Cover of a Bin Assembly."

BACKGROUND INFORMATION

1. Field

The present disclosure relates generally to stowage bins and, in particular, to overhead stowage bins used in aircraft. Still more particularly, the present disclosure relates to a method and apparatus for attaching a trim member to a cover of an overhead stowage bin.

2. Background

Stowage bins in aircraft may be used by passengers for stowing away luggage, personal items, and other types of items. Flight crew members may also use stowage bins for stowing away in-flight amenities during flight. Currently, most stowage bins are located above passenger seats in the cabin of an aircraft. These stowage bins may be referred to as overhead stowage bins. A passenger, a crew member, or some other person onboard an aircraft may operate an overhead stowage bin in a manner that allows access to the inside of the stowage bin. The inboard edge common to the entrance to the inside of the stowage bin may need to be protected from repeated use of the stowage bin over time and for safety reasons. Consequently, a trim may be used to protect this lower edge of the stowage bin. This trim may be referred to as a threshold trim because the trim protects the "threshold," or opening, to the inside of the stowage bin. Additionally, the trim may be used to improve the aesthetic appearance of the lower edge of the stowage bin.

The threshold trim may be typically attached to the stowage bin by attaching the threshold trim to a torque tube cover in the stowage bin. The torque tube cover may be a cover used to cover a torque tube attached to the stowage bin. The torque tube may be part of a latch assembly used for opening and closing the stowage bin. The threshold trim may be positioned around the inboard edge of the stowage bin and fastened to the cover using countersunk fasteners. Attaching the threshold trim to the cover using countersunk fasteners may be more time-consuming and labor-intensive than desired.

Further, undesirable effects may be induced at the locations of these fasteners by the fasteners and/or by contact with certain chemical solvents, such as cleaning solvents, over time. Therefore, it would be desirable to have a method and apparatus that take into account at least some of the issues discussed above, as well as other possible, related issues.

SUMMARY

In one illustrative embodiment, an apparatus may comprise an attachment element. The attachment element may comprise a bonding member, a biased member, and a groove. The bonding member may be configured to be bonded to a trim member. The biased member may be biased towards the bonding member. The groove may be formed between the bonding member and the biased member. The groove may be configured to receive a portion of the structure to attach the trim member to the structure.

In another illustrative embodiment, a stowage bin for an aircraft may comprise a trim member for the stowage bin, a cover associated with the stowage bin, and a set of attachment elements. The set of attachment elements may be configured for use in attaching the trim member to the cover to cover an edge of the stowage bin. An attachment element in the set of attachment elements may comprise a bonding member, a biased member, and a groove. The bonding member may be bonded to the trim member. The biased member may be biased towards the bonding member. The groove may be formed between the bonding member and the biased member. A portion of the cover may be configured to be slid into the groove and held in place by the biased member. A bias of the biased member towards the bonding member may be sufficiently high to prevent the portion of the cover held within the groove from moving without application of a force greater than a selected threshold.

In yet another illustrative embodiment, a method for attaching a trim member for a stowage bin to a structure associated with the stowage bin may be provided. A bonding member of an attachment element may be bonded to the trim member. A portion of the structure may be received within a groove formed between the bonding member and a biased member of the attachment element. The portion of the structure may be held in place within the groove by the biased member of the attachment element such that the trim member is attached to the structure.

In still another illustrative embodiment, a method for attaching a trim member for a stowage bin to a cover associated with the stowage bin may be provided. A bonding member of an attachment element may be bonded, adhesively, to a bonding surface of the trim member using an adhesive material. A force greater than a selected threshold may be applied to the cover to slide a portion of the cover into a groove formed between the bonding member and a biased member of the attachment element. The portion of the cover may be received within the groove. The portion of the cover may be held in place within the groove by the biased member of the attachment element such that the trim member is attached to the cover in a manner that covers an edge of the stowage bin. A bias of the biased member towards the bonding member may be sufficiently high to prevent the portion of the cover held in place within the groove from moving without application of the force greater than the selected threshold.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a method and apparatus for attaching a threshold trim to a stowage bin that reduces the possibility of undesired effects occurring. Further, the illustrative embodiments recognize and take into account that it may be desirable to have a method and apparatus for attaching a threshold trim to a stowage bin that reduces the time and labor required for this process as compared to using countersunk fasteners to attach the trim to the stowage bin.

Figure 1:
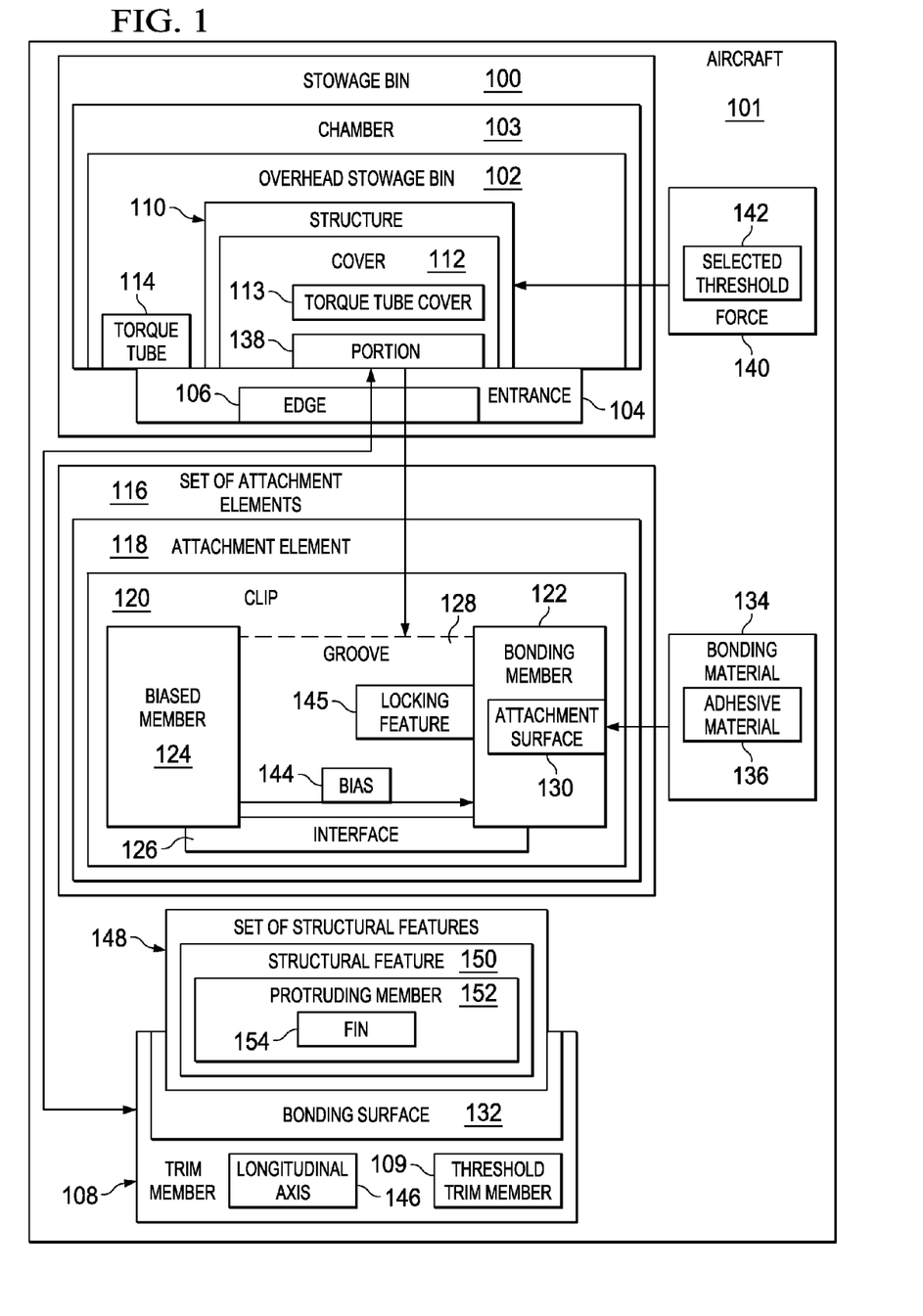
FIG. 1 is an illustration of a stowage bin for an aircraft in the form of a block diagram in accordance with an illustrative embodiment.

Referring now to the figures and, in particular, with reference to FIG. 1, an illustration of a stowage bin for an aircraft is depicted in the form of a block diagram in accordance with an illustrative embodiment. In this illustrative example, stowage bin 100 may be used in aircraft 101 for stowing away various items such as, for example, without limitation, passenger items, luggage, and other types of items. As depicted, stowage bin 100 may take the form of overhead stowage bin 102 in this illustrative example.

Stowage bin 100 may have chamber 103 with entrance 104 to chamber 103. Chamber 103 may be the part of stowage bin 100 used for storage. Edge 106 of stowage bin 100 may be located at entrance 104 to chamber 103. In this manner, edge 106 may be located at the "threshold" of entrance 104 to chamber 103.

Trim member 108 may be used to protect, reinforce, and enhance the aesthetic appearance of edge 106. Trim member 108 may be referred to as threshold trim member 109 in some illustrative examples. Trim member 108 may be attached to stowage bin 100 by being attached to structure 110 associated with stowage bin 100.

As used herein, when one component is "associated" with another component, the association is a physical association in the depicted examples. For example, a first component, such as structure 110, may be considered to be associated with a second component, such as stowage bin 100, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

In this illustrative example, structure 110 may take the form of cover 112 used to cover torque tube 114 associated with stowage bin 100. In some cases, cover 112 may be referred to as torque tube cover 113. In this illustrative example, trim member 108 may be positioned relative to edge 106 and then secured to cover 112 to attach trim member 108 to stowage bin 100.

Set of attachment elements 116 may be used to attach trim member 108 to structure 110. As used herein, a "set" of items may include one or more items. In this manner, set of attachment elements 116 may include one or more attachment elements. The number of attachment elements included in this set may depend on, for example, the length of trim member 108.

Attachment element 118 may be an example of one of set of attachment elements 116. Attachment element 118 may take a number of different forms. In this illustrative example, attachment element 118 may take the form of clip 120. When each of set of attachment elements 116 takes the form of a clip, set of attachment elements 116 may be a set of clips.

As depicted, attachment element 118 may include bonding member 122 and biased member 124. In some cases, bonding member 122 and biased member 124 may be referred to as the legs of attachment element 118. Biased member 124 may be biased towards bonding member 122. In particular, biased member 124 may be moveable relative to bonding member 122 with the application of force. At least a portion of biased member 124 may be moved away from some initial position relative to bonding member 122 using force. However, in the absence of any external forces, biased member 124 may return to this initial position.

Bonding member 122 and biased member 124 may be associated with each other through interface 126. Interface 126 may take the form of, for example, without limitation, a U-shaped interface. Of course, depending on the implementation, interface 126 may take some other type of shape.

In one illustrative example, bonding member 122 and biased member 124 may be two portions of a same structural element and interface 126 may be the portion of this structural element that joins bonding member 122 and biased member 124 together. In other illustrative examples, interface 126 may take the form of a hinged joint, or some other type of joint that may allow biased member 124 to be biased towards bonding member 122, while allowing at least a portion of biased member 124 to be moved away from bonding member 122 using force.

Groove 128 may be formed between bonding member 122 and biased member 124. Groove 128 may be configured to receive structure 110. Groove 128 may be enlarged, or widened, by sliding structure 110 into groove 128.

In this illustrative example, bonding member 122 may be used to bond attachment element 118 to trim member 108. In particular, bonding member 122 may have attachment surface 130 that is to be bonded to bonding surface 132 of trim member 108. In one illustrative example, both attachment surface 130 and bonding surface 132 may be substantially planar. In other words, attachment surface 130 and bonding surface 132 may be flat.

Bonding material 134 may be used to bond attachment surface 130 to bonding surface 132. Bonding material 134 may take the form of, for example, without limitation, adhesive material 136. Adhesive material 136 may take the form of, for example, without limitation, some type of glue or cement material.

In this illustrative example, once bonding member 122 has been attached to trim member 108, portion 138 of structure 110 may be slid into groove 128. In particular, force 140 greater than some selected threshold 142 may be applied to structure 110 to slide portion 138 of structure 110 into groove 128. Force 140 greater than some selected threshold 142 may be required because of bias 144 of biased member 124 towards bonding member 122. Bias 144 of biased member 124 towards bonding member 122 may be sufficiently high to prevent portion 138 of structure 110, which is held in place within groove 128 by biased member 124, from moving relative to attachment element 118 without application of force 140 greater than selected threshold 142 being applied to structure 110.

Further, attachment element 118 may also include locking feature 145. Locking feature 145 may be associated with bonding member 122 in this example and used to hold and lock portion 138 of structure 110 in place within groove 128. Locking feature 145 may help in preventing portion 138 of structure 110 from moving relative to attachment element 118 without application of force 140 greater than selected threshold 142 being applied to structure 110. In other words, locking feature 145 and bias 144 of biased member 124 may together prevent portion 138 of structure 110 from moving out of groove 128 without the application of force 140 greater than selected threshold 142.

In this illustrative example, when more than one attachment element is included in set of attachment elements 116, these attachment elements may be bonded to trim member 108 such that the attachment elements are spaced out along longitudinal axis 146 through trim member 108. The spacing between these different attachment elements may be substantially constant or may vary, depending on the implementation.

In some cases, set of structural features 148 may be associated with bonding surface 132 of trim member 108. Set of structural features 148 may be used to constrain movement of set of attachment elements 116 relative to trim member 108. For example, without limitation, set of structural features 148 may be used to limit or prevent the movement of set of attachment elements 116 in a direction substantially parallel to longitudinal axis 146. In this manner, set of structural features 148 may prevent set of attachment elements 116 from sliding along bonding surface 132 of trim member 108 in a direction substantially parallel to longitudinal axis 146.

In one illustrative example, structural feature 150 in set of structural features 148 may take the form of protruding member 152 that protrudes away from bonding surface 132. Protruding member 152 may take the form of, for example, fin 154. In this illustrative example, the area of bonding surface 132 located between each adjacent pair of structural features in set of structural features 148 may define a bonding area that may be configured for use in attaching an attachment element, such as attachment element 118. Further, this adjacent pair of structural features may then physically constrain the movement of this attachment element.

The illustration of stowage bin 100 and set of attachment elements 116 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
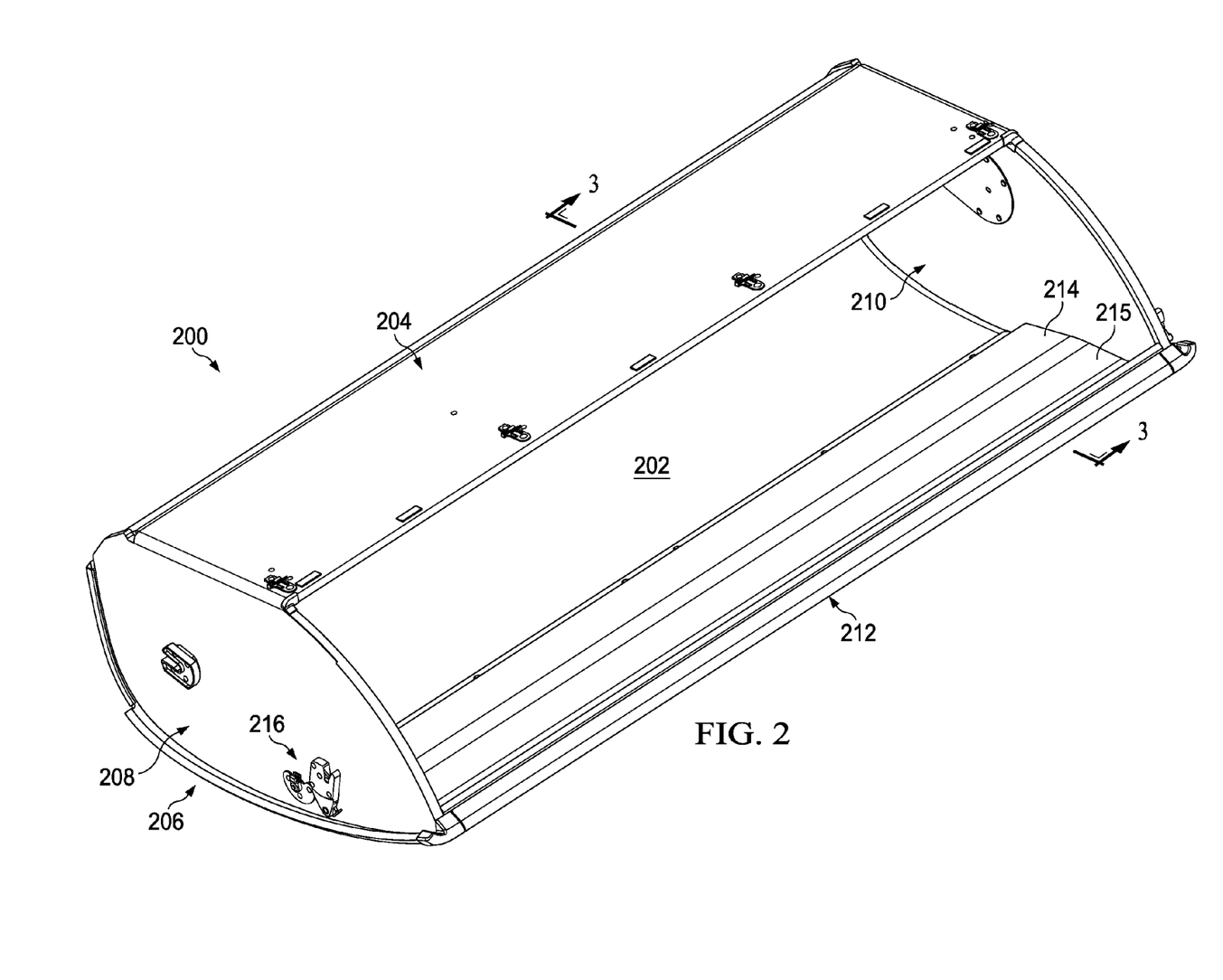
FIG. 2 is an illustration of an isometric view of a stowage bin in accordance with an illustrative embodiment.

With reference now to FIG. 2, an illustration of an isometric view of a stowage bin is depicted in accordance with an illustrative embodiment. In this illustrative example, stowage bin 200 may be an example of one implementation for stowage bin 100 in FIG. 1. Stowage bin 200 may be an overhead stowage bin in this example.

As depicted, stowage bin 200 may have chamber 202 formed by first side 204, second side 206, third side 208, and fourth side 210 of stowage bin 200. Chamber 202 may be an example of one implementation for chamber 103 in FIG. 1.

In this illustrative example, trim member 212 may be used to protect and reinforce the edge (not shown in this view) formed by second side 206. Further, trim member 212 may also be used to enhance the aesthetic appearance of this edge (not shown in this view). Trim member 212 may be an example of one implementation for trim member 108 in FIG. 1. Trim member 212 may be referred to as a threshold trim member in some illustrative examples.

Trim member 212 may be attached to this edge of stowage bin 200 by being attached to structure 214. Structure 214 may be an example of one implementation for structure 110 in FIG. 1. In this illustrative example, structure 214 may take the form of cover 215 for a torque tube (not shown in this view) associated with stowage bin 200. This torque tube (not shown in this view) may be part of latch assembly 216 used to operate stowage bin 200. In particular, latch assembly 216 may be used to open and close stowage bin 200.

Cover 215 may be an example of one implementation for cover 112 in FIG. 1. Cover 215 may be also referred to as a torque tube cover.

Figure 3:
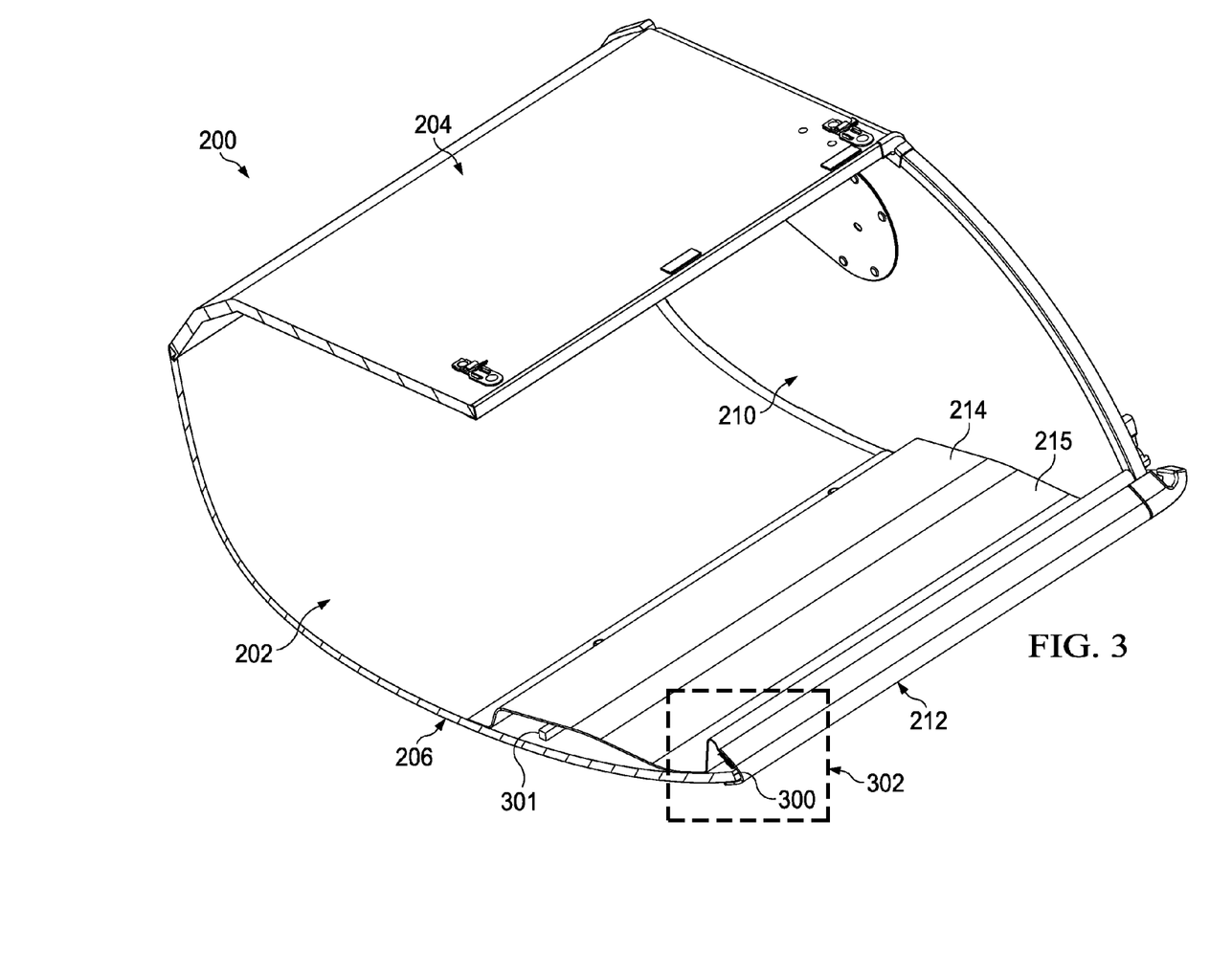
FIG. 3 is an illustration of a cross-sectional view of a stowage bin in accordance with an illustrative embodiment.

Turning now to FIG. 3, an illustration of a cross-sectional view of stowage bin 200 from FIG. 2 is depicted in accordance with an illustrative embodiment. In this illustrative example, a cross-sectional view of stowage bin 200 from FIG. 2 may be depicted with respect to lines 3-3 in FIG. 2.

Edge 300 of second side 206 of stowage bin 200 may be seen in this view in portion 302 of stowage bin 200. As depicted, trim member 212 may cover edge 300. Further, in this example, trim member 212 may protect and reinforce edge 300. Further, torque tube 301 covered by cover 215 is seen in this view. Torque tube 301 may be part of latch assembly 216 depicted in FIG. 2.

In this illustrative example, the attachment of cover 215 to trim member 212 is shown within portion 302. An enlarged view of portion 302 of stowage bin 200 may be depicted in FIG. 4 below.

Figure 4:
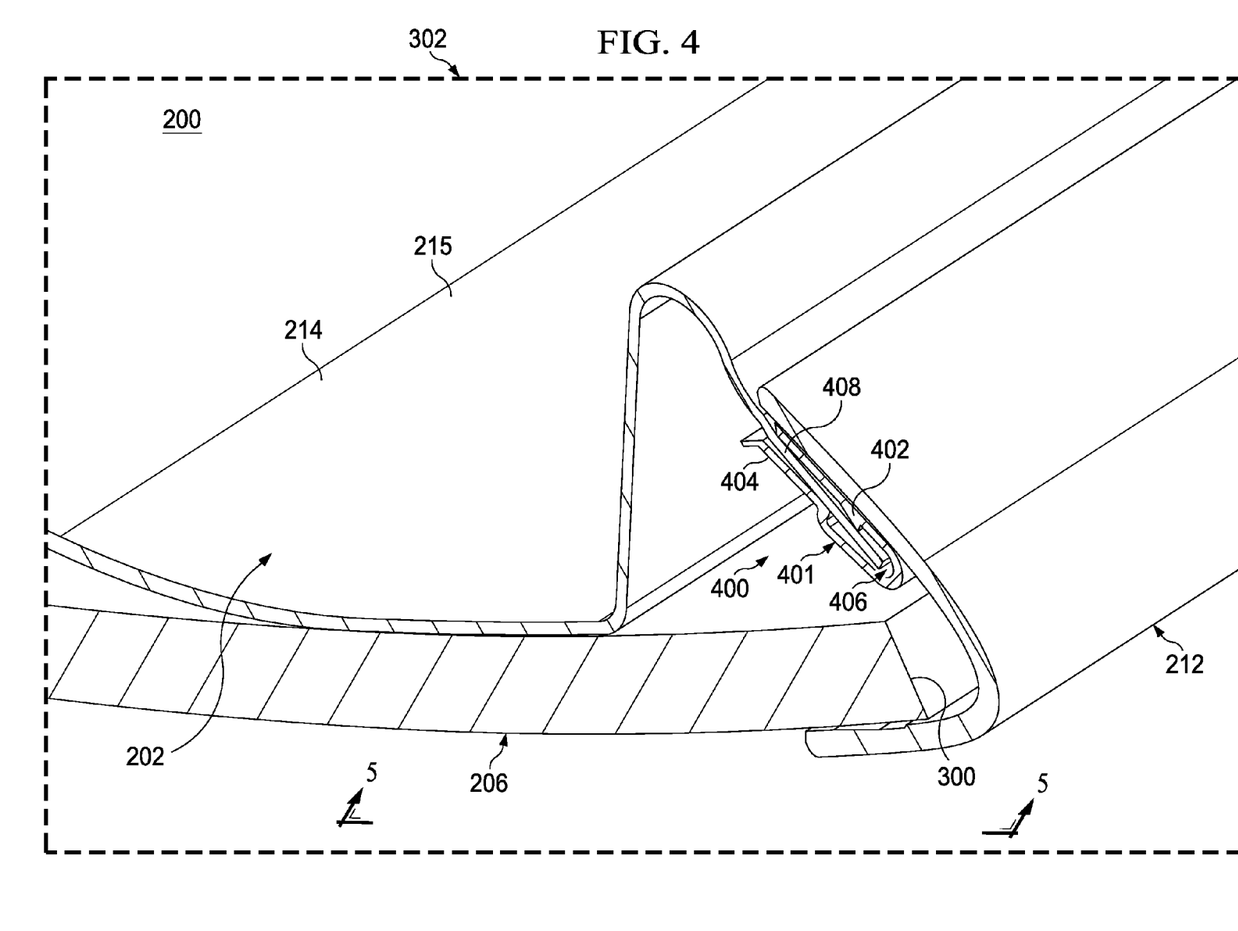
FIG. 4 is an illustration of an enlarged view of a portion of a stowage bin in accordance with an illustrative embodiment.

With reference now to FIG. 4, an illustration of an enlarged view of portion 302 of stowage bin 200 from FIG. 3 is depicted in accordance with an illustrative embodiment. In this illustrative example, attachment element 400 may be seen. Attachment element 400 may be an example of one implementation for attachment element 118 in FIG. 1. Attachment element 400 may take the form of clip 401 in this illustrative example. Clip 401 may be an example of one implementation for clip 120 in FIG. 1.

As depicted, attachment element 400 may include bonding member 402 and biased member 404. Bonding member 402 and biased member 404 may be examples of implementations for bonding member 122 and biased member 124, respectively, in FIG. 1. In this illustrative example, groove 406 may be formed between bonding member 402 and biased member 404. Further, biased member 404 may be biased towards bonding member 402.

Further, portion 408 of structure 214 may be held in place within groove 406. Portion 408 may be an example of one implementation for portion 138 of structure 110 in FIG. 1. In this example, portion 408 may be referred to as the flanged portion of structure 214.

Figure 5:
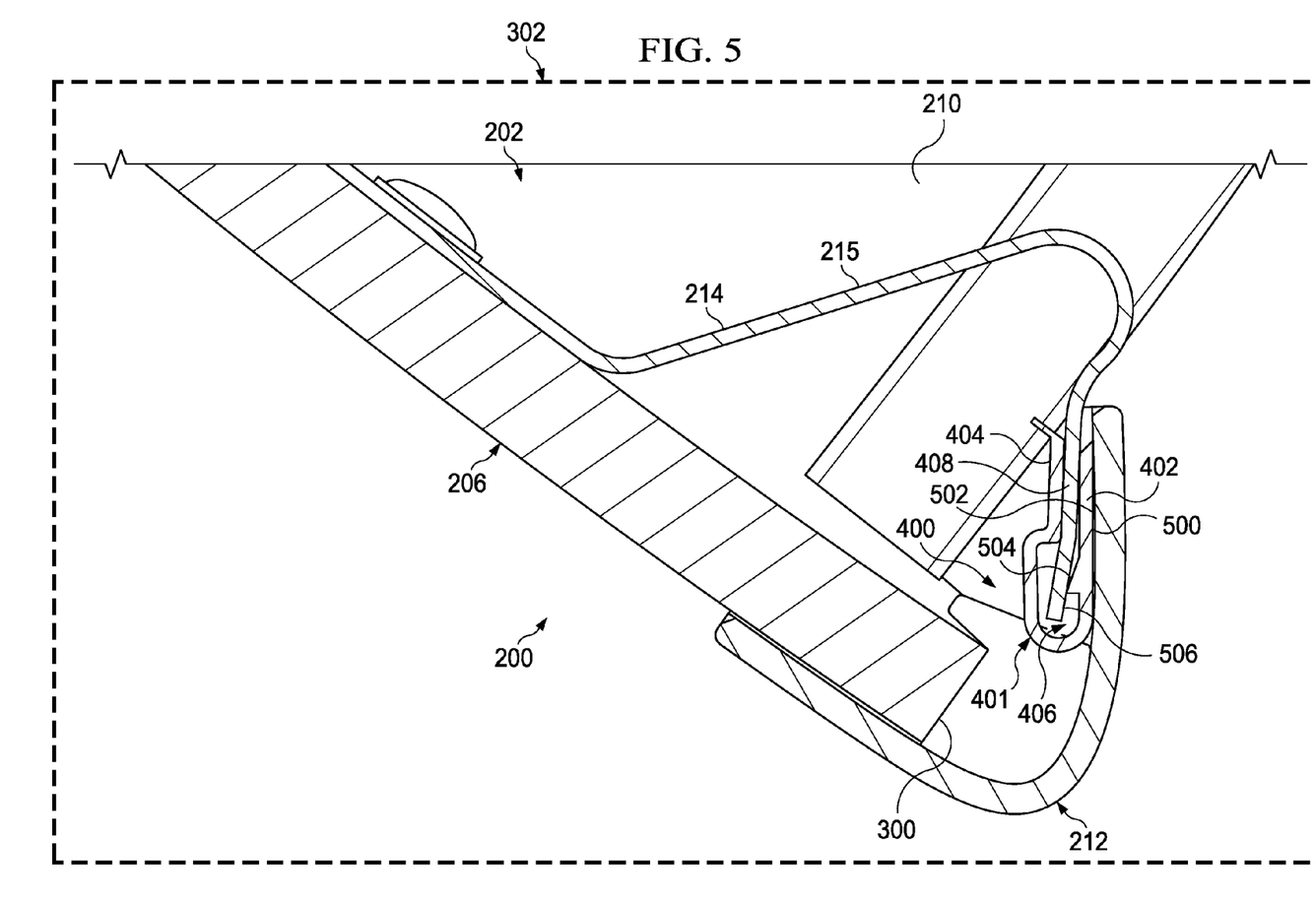
FIG. 5 is an illustration of a side view of a portion of a stowage bin in accordance with an illustrative embodiment.

Turning now to FIG. 5, an illustration of a side view of portion 302 of stowage bin 200 from FIG. 4 is depicted in accordance with an illustrative embodiment. In FIG. 5, a side view of portion 302 of stowage bin 200 from FIG. 4 is depicted with respect to lines 5-5 in FIG. 4. As depicted, attachment surface 500 of bonding member 402 may be adhesively bonded to bonding surface 502 of trim member 212.

Further, locking feature 504 of attachment element 400 may be more clearly seen in this view. Locking feature 504 may be an example of one implementation for locking feature 145 in FIG. 1. Locking feature 504 may help keep portion 408 of structure 214 in place within groove 406.

Figure 6:
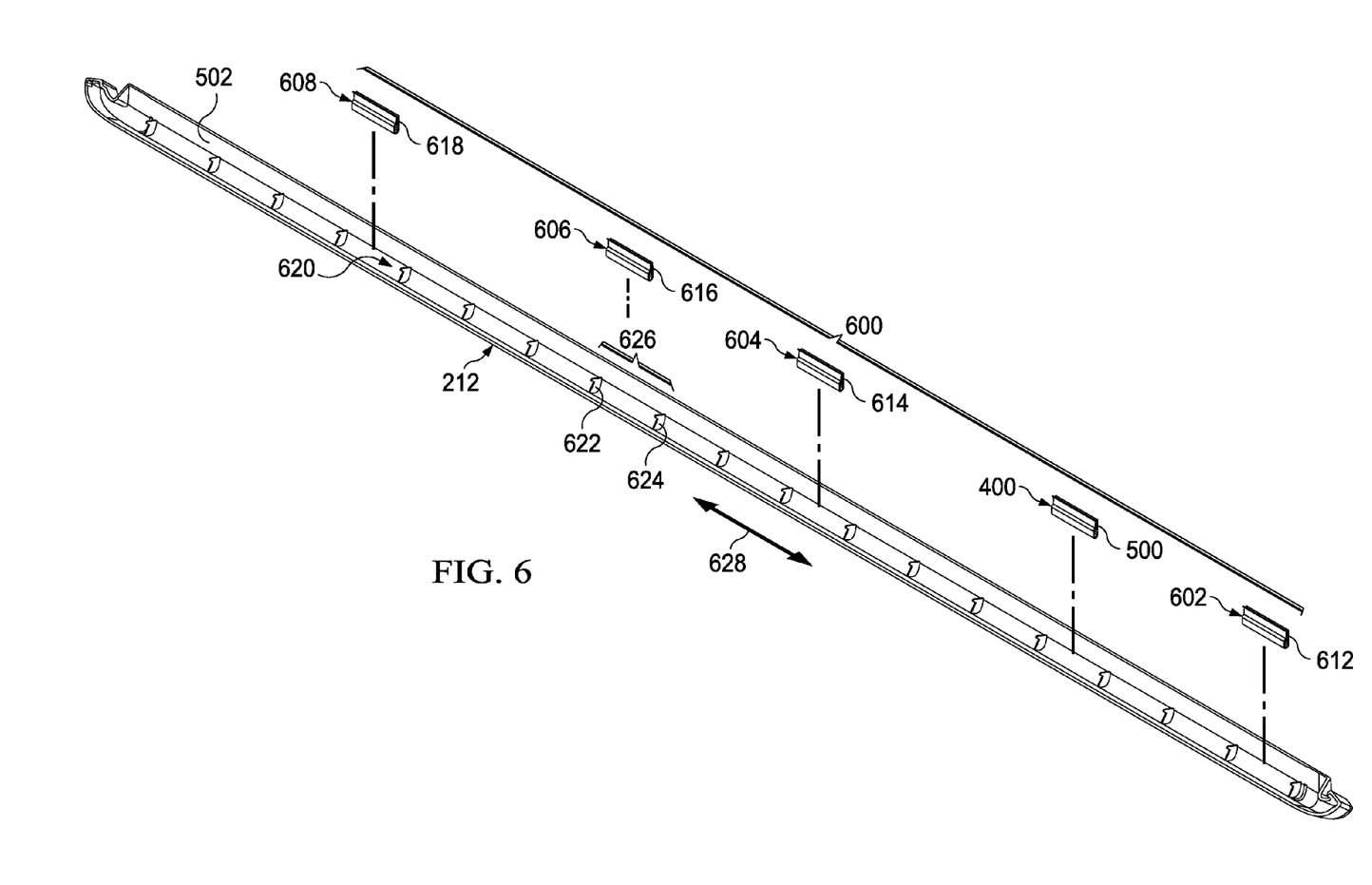
FIG. 6 is an illustration of a set of attachment elements for a trim member in accordance with an illustrative embodiment.

With reference now to FIG. 6, an illustration of a set of attachment elements for trim member 212 is depicted in accordance with an illustrative embodiment. In this illustrative example, set of attachment elements 600 may be an example of one implementation for set of attachment elements 116 in FIG. 1. As depicted, set of attachment elements 600 may be bonded to bonding surface 502 of trim member 212.

Set of attachment elements 600 may include attachment element 400 from FIGS. 4-5, and attachment elements 602, 604, 606, and 608. Attachment elements 400, 602, 604, 606, and 608 may have attachment surfaces 500, 612, 614, 616, and 618, respectively. These attachments may be adhesively bonded to bonding surface 502 of trim member 212.

In this illustrative example, set of structural features 620 may be associated with bonding surface 502 of trim member 212. Set of structural features 620 may be an example of one implementation for set of structural features 148 in FIG. 1. Set of structural features 620 may include, for example, structural feature 622 and structural feature 624. These structural features may form a pair of protruding members that extend out from bonding surface 502. These protruding members may be referred to as fins in some cases.

Bonding area 626 may be the area of bonding surface 502 located between structural feature 622 and structural feature 624. Attachment element 606 may be configured for attachment to bonding area 626. Once attachment element 606 has been attached to bonding area 626, structural feature 622 and structural feature 624 may prevent attachment element 606 from moving relative to trim member 212 in a direction substantially parallel to longitudinal axis 628 for trim member 212. In this manner, set of structural features 620 may be used to constrain the movement of set of attachment elements 600 relative to bonding surface 502.

Figure 7:
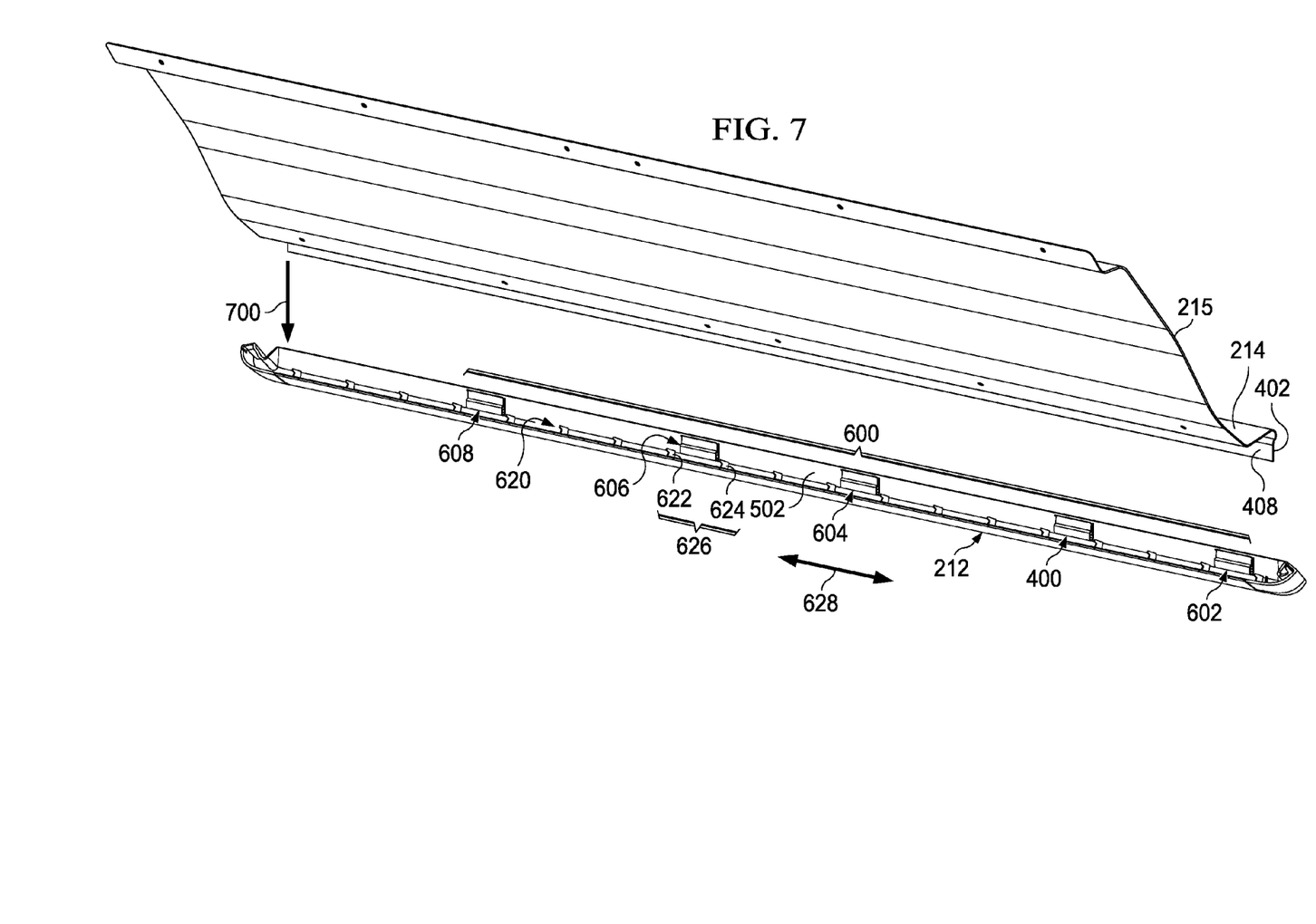
FIG. 7 is an illustration of a set of attachment elements adhesively bonded to a trim member in accordance with an illustrative embodiment.

With reference now to FIG. 7, an illustration of set of attachment elements 600 from FIG. 6 adhesively bonded to trim member 212 is depicted in accordance with an illustrative embodiment. Once set of attachment elements 600 have been adhesively bonded to trim member 212, portion 408 of structure 214 may then be moved in the direction of arrow 700 relative to trim member 212 and slid into the grooves of these attachment elements.

Figure 8:
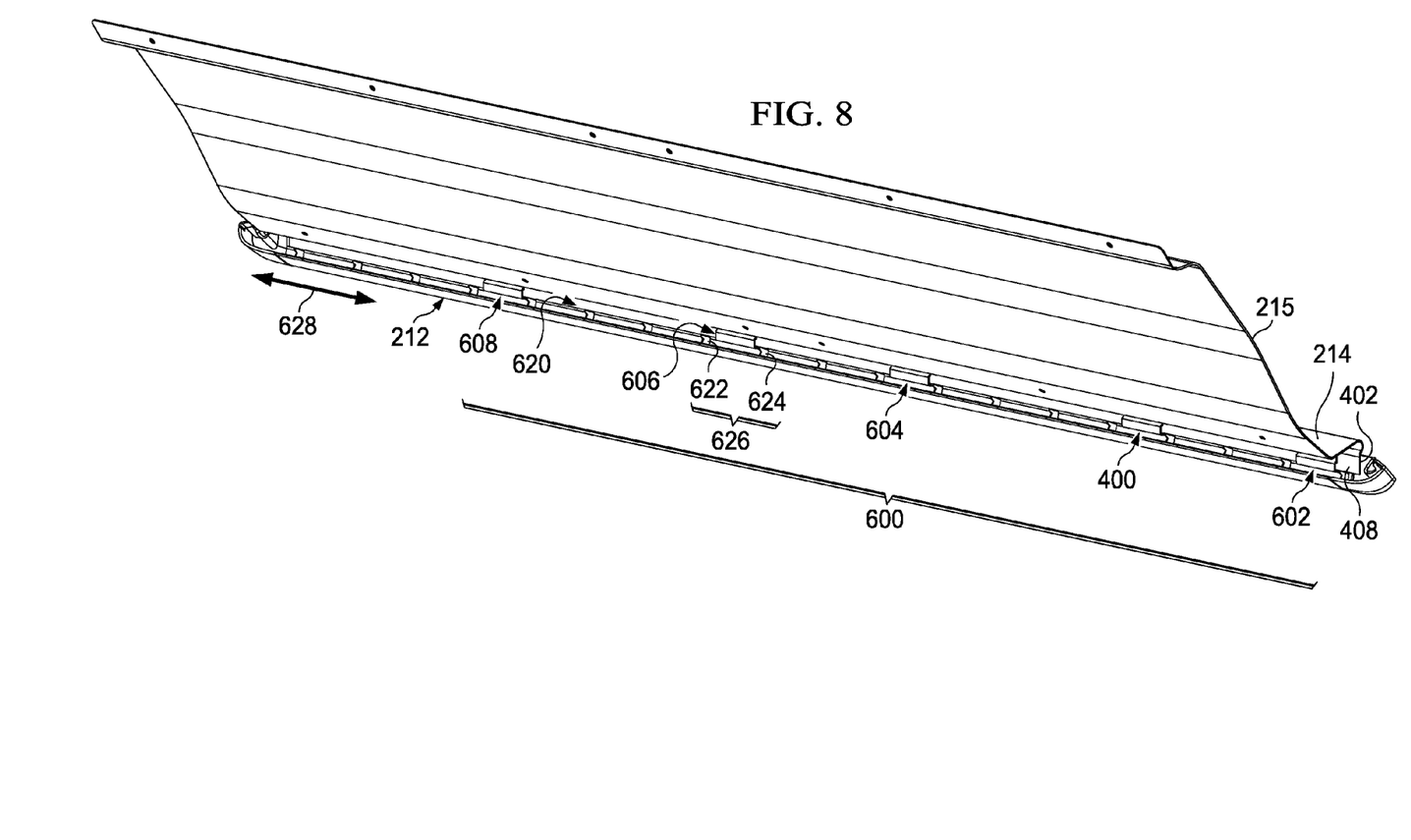
FIG. 8 is an illustration of a trim member attached to a structure in accordance with an illustrative embodiment.

Turning now to FIG. 8, an illustration of trim member 212 attached to structure 214 is depicted in accordance with an illustrative embodiment. In this illustrative example, portion 408 of structure 214 has been slid into the groove of each of set of attachment elements 600, thereby attaching trim member 212 to structure 214.

Figure 9:
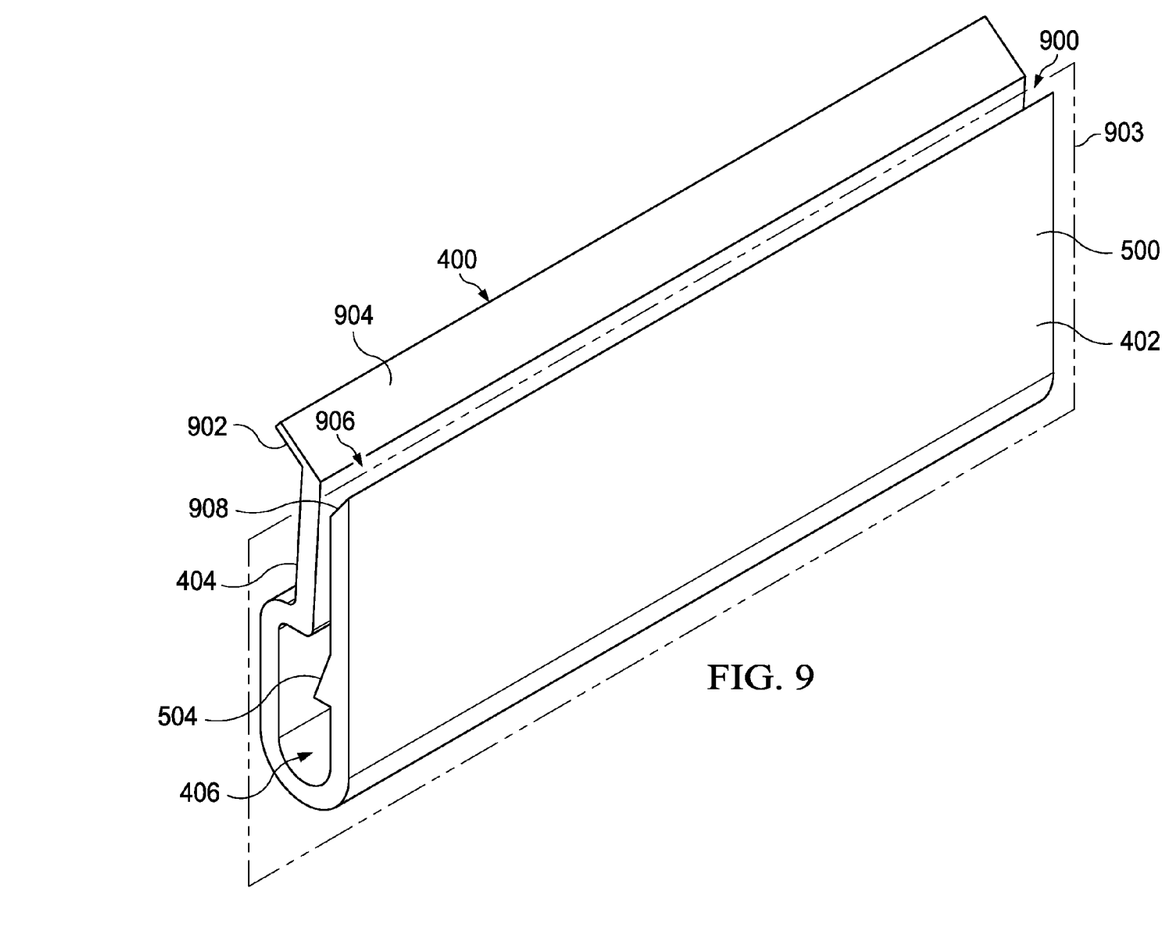
FIG. 9 is an illustration of an isometric view of an attachment element in accordance with an illustrative embodiment.

With reference now to FIG. 9, an illustration of an isometric view of attachment element 400 from FIGS. 4-8 is depicted in accordance with an illustrative embodiment. Portion 408 of structure 214 (not shown) from FIG. 4 may enter and slide into groove 406 through opening 900.

Biased member 404 may have flange 902 located at opening 900. Flange 902 may be angled relative to plane 903 through groove 406. Further, flange 902 may have surface 904. As depicted, surface 904 may be substantially planar. The angle of flange 902 and surface 904 of flange 902 may help portion 408 of structure 214 (not shown) more easily enter and slide into groove 406 through opening 900.

Similarly, bonding member 402 may have angled edge 906. Angled edge 906 may be angled relative to plane 903. Further, angled edge 906 may have edge surface 908 that is substantially planar. Angled edge 906 and edge surface 908 of angled edge 906 may aid in the sliding of portion 408 of structure 214 (not shown) into groove 406 through opening 900.

The illustrations of stowage bin 200 in FIGS. 2-4, attachment element 400 in FIGS. 4-9, and set of attachment elements 600 in FIGS. 6-8 are not meant to imply physical or architectural limitations to the manner in which an illustrative embodiment may be implemented. Other components in addition to or in place of the ones illustrated may be used. Some components may be optional.

The different components shown in FIGS. 2-9 may be illustrative examples of how components shown in block form in FIG. 1 can be implemented as physical structures. Additionally, some of the components in FIGS. 2-9 may be combined with components in FIG. 1, used with components in FIG. 1, or a combination of the two.

Figure 10:
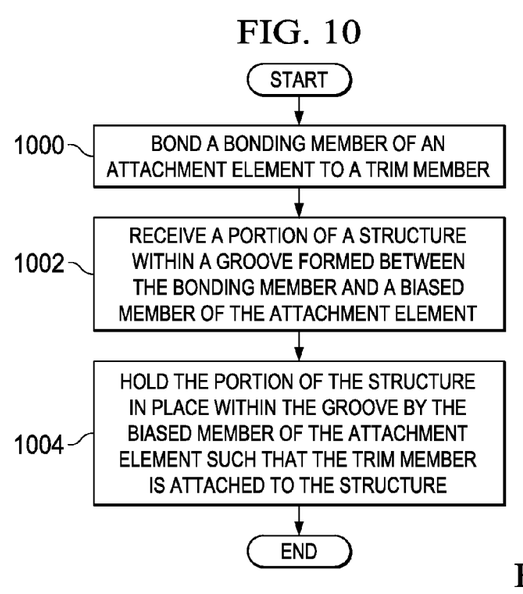
FIG. 10 is an illustration of a process for attaching a trim member for a stowage bin to a structure associated with the stowage bin in the form of a flowchart in accordance with an illustrative embodiment.

With reference now to FIG. 10, an illustration of a process for attaching a trim member for a stowage bin to a structure associated with the stowage bin is depicted in the form of a flowchart in accordance with an illustrative embodiment. The process illustrated in FIG. 10 may be used to attach, for example, trim member 108 from FIG. 1 to structure 110 associated with stowage bin 100 in FIG. 1.

The process may begin by bonding member 122 of attachment element 118 to trim member 108 (operation 1000). Next, portion 138 of structure 110 may be received within groove 128 formed between bonding member 122 and biased member 124 of attachment element 118 (operation 1002). Thereafter, portion 138 of structure 110 may be held in place within groove 128 by biased member 124 of attachment element 118 such that trim member 108 is attached to structure 110 (operation 1004), with the process terminating thereafter.

Figure 11:
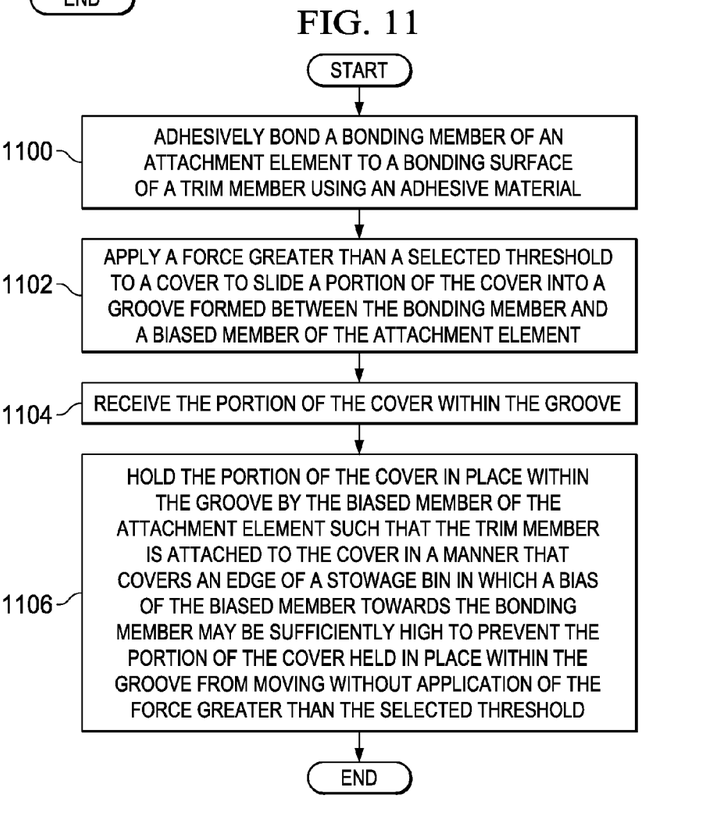
FIG. 11 is an illustration of a process for attaching a trim member for a stowage bin to a structure associated with the stowage bin in the form of a flowchart in accordance with an illustrative embodiment.

With reference now to FIG. 11, an illustration of a process for attaching a trim member for a stowage bin to a structure associated with the stowage bin is depicted in the form of a flowchart in accordance with an illustrative embodiment. The process illustrated in FIG. 11 may be used to attach, for example, trim member 108 from FIG. 1 to cover 112 associated with stowage bin 100 in FIG. 1.

The process may begin by adhesively bonding member 122 of attachment element 118 to bonding surface 132 of trim member 108 using adhesive material 136 (operation 1100). Force 140 greater than selected threshold 142 may be applied to cover 112 to slide portion 138 of cover 112 into groove 128 formed between bonding member 122 and biased member 124 of attachment element 118 (operation 1102). Portion 138 of cover 112 may be received within groove 128 (operation 1104). Portion 138 of cover 112 may be held in place within groove 128 by biased member 124 of attachment element 118 such that trim member 108 is attached to cover 112 in a manner that covers edge 106 of stowage bin 100 in which bias 144 of biased member 124 towards bonding member 122 may be sufficiently high to prevent portion 138 of cover 112 held in place within groove 128 from moving without application of force 140 greater than selected threshold 142 (operation 1106), with the process terminating thereafter.

Figure 12:
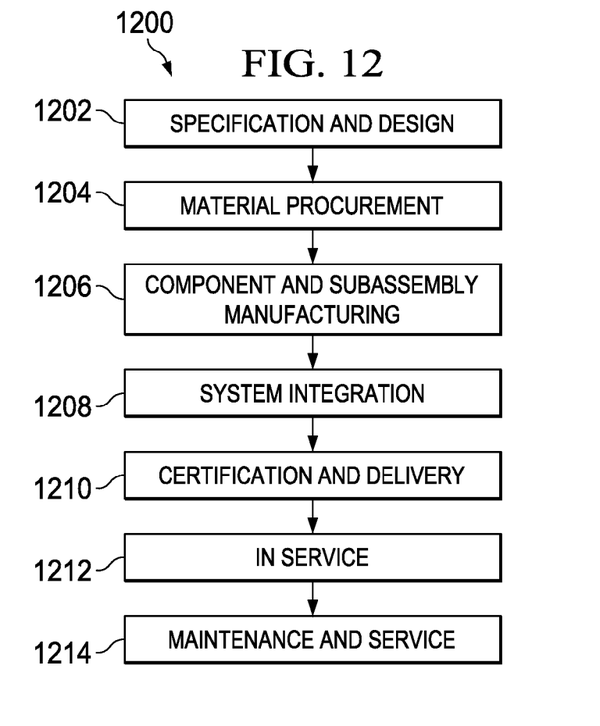
FIG. 12 is an illustration of an aircraft manufacturing and service method in the form of a block diagram in accordance with an illustrative embodiment.
Figure 13:
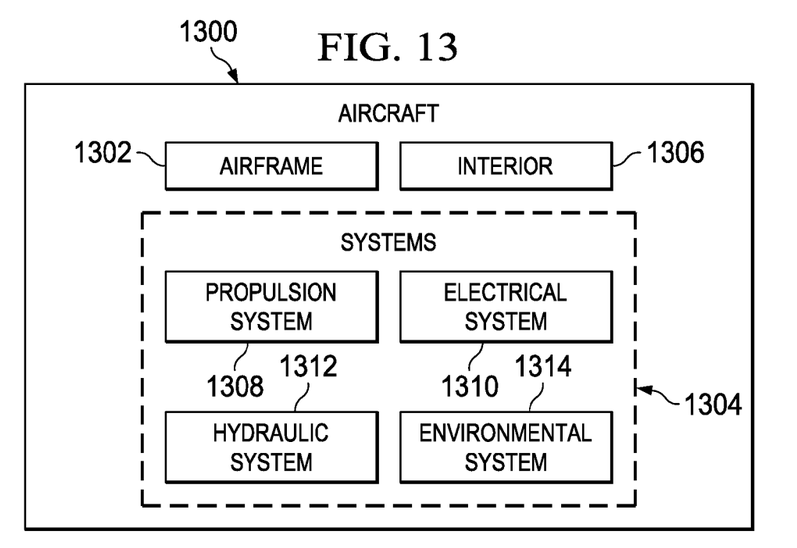
FIG. 13 is an illustration of an aircraft in the form of a block diagram in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in the form of a block diagram in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 in order to be placed in service 1212. While in service 1212 by a customer, aircraft 1300 in FIG. 13 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in the form of a block diagram in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. Stowage bin 100 from FIG. 1 may be an example of a stowage bin that may be used in interior 1306 of aircraft 1300. Trim member 108 from FIG. 1 may be attached to stowage bin 100 from FIG. 1 during any one of the stages of aircraft manufacturing and service method 1200. For example, without limitation, trim member 108 from FIG. 1 may be attached to stowage bin 100 during at least one of component and subassembly manufacturing 1206, system integration 1208, routine maintenance and service 1214, or some other stage of aircraft manufacturing and service method 1200.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12. One or more apparatus embodiments, method embodiments, or a combination thereof may be utilized while aircraft 1300 is in service 1212 and/or during maintenance and service 1214 in FIG. 12. The use of a number of the different illustrative embodiments may substantially expedite the assembly of and/or reduce the cost of aircraft 1300.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for attaching a trim member, such as trim member 108 in FIG. 1, to a structure associated with a stowage bin, such as structure 110 associated with stowage bin 100 in FIG. 1. Bonding member 122 of attachment element 118 may be bonded to trim member 108. Portion 138 of structure 110 may be received within groove 128 formed between bonding member 122 and biased member 124 of attachment element 118. Portion 138 of structure 110 may be held in place within groove 128 by biased member 124 of attachment element 118 such that trim member 108 is attached to structure 110.

Using set of attachment elements 116 described in FIG. 1 may reduce the occurrence of undesired stress concentrations along trim member 108 and/or structure 110. Further, using set of attachment elements 116 to attach trim member 108 to structure 110 may reduce the overall assembly times for stowage bin 100.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
an attachment element comprising a clip and further comprising:
a bonding member, comprising a first leg of the clip, and configured to be bonded to a trim member;
a biased member, comprising a second leg of the clip, and biased towards the bonding member; and
a groove formed between the bonding member and the biased member and configured to receive a portion of a structure to attach the trim member to the structure.

2. The apparatus of claim 1, wherein the portion of the structure is slid into the groove by applying a force greater than a selected threshold.

3. The apparatus of claim 1, wherein a bias of the biased member towards the bonding member prevents the portion of the structure held in place within the groove by the biased member from moving without application of a force greater than a selected threshold.

4. The apparatus of claim 1, wherein the bonding member is bonded to the trim member using an adhesive material.

5. The apparatus of claim 1 further comprising:
the trim member, wherein the trim member is configured to protect and reinforce an edge of a stowage bin located at an entrance to a chamber within the stowage bin.

6. The apparatus of claim 5 further comprising:
the structure, wherein the structure is a torque tube cover associated with the stowage bin.

7. The apparatus of claim 6, wherein the trim member is configured for attachment to the torque tube cover and the edge of the stowage bin.

8. The apparatus of claim 1, wherein the trim member comprises:
a structural feature that forms a bonding area to which the bonding member of the attachment element is to be bonded, wherein the structural feature is configured to prevent movement of the attachment element in a direction substantially parallel to a longitudinal axis through the trim member.

9. The apparatus of claim 8, wherein the structural feature comprises a pair of protruding members that protrude from a bonding surface of the trim member.

10. The apparatus of claim 1, wherein the attachment element is one of a set of attachment elements configured for use in attaching the trim member to the structure.

11. The apparatus of claim 1, wherein the trim member is a threshold trim member.

12. A stowage bin for an aircraft, the stowage bin comprising:
a trim member for the stowage bin;
a cover associated with the stowage bin; and
a set of attachment elements configured for use in attaching the trim member to the cover to cover an edge of the stowage bin in which an attachment element in the set of attachment elements comprises a clip and further comprising:
a bonding member, comprising a first leg of the clip, and bonded to the trim member;
a biased member, comprising a second leg of the clip, and biased towards the bonding member; and
a groove formed between the bonding member and the biased member in which a portion of the cover is configured to be slid into the groove and held in place by the biased member in which a bias of the biased member towards the bonding member prevents the portion of the cover held within the groove from moving without application of a force greater than a selected threshold.

13. A method for attaching a trim member for a stowage bin to a structure associated with the stowage bin, the method comprising:
bonding a bonding member of an attachment element to the trim member, the attachment element comprising a clip and the bonding member comprising a first leg of the clip;
receiving a portion of the structure within a groove formed between the bonding member and a biased member of the attachment element, the biased member comprising a second leg of the clip; and
holding the portion of the structure in place within the groove by the biased member of the attachment element such that the trim member is attached to the structure.

14. The method of claim 13 further comprising:
applying a force greater than a selected threshold to the structure to slide the portion of the structure into the groove of the attachment element.

15. The method of claim 13, wherein holding the portion of the structure in place within the groove comprises: holding the portion of the structure in place within the groove by the biased member of the attachment element such that the trim member is attached to the structure, wherein a bias of the biased member towards the bonding member prevents the portion of the structure held in place within the groove from moving without application of a force greater than a selected threshold.

16. The method of claim 13, wherein bonding the bonding member of the attachment element to the trim member comprises:
applying an adhesive material to an attachment surface of the bonding member; and
bonding, adhesively, the bonding member of the attachment element to a bonding surface of the trim member using the adhesive material.

17. The method of claim 13, wherein attaching the trim member to the structure covers an edge of the stowage bin.

18. The method of claim 13 further comprising:
preventing movement of the attachment element bonded to the trim member in a direction substantially parallel to a longitudinal axis through the trim member using a structural feature on the trim member.

19. A method for attaching a trim member for a stowage bin to a cover associated with the stowage bin, the method comprising:
bonding, adhesively, a bonding member of an attachment element to a bonding surface of the trim member using an adhesive material, the attachment element comprising a clip and the bonding member comprising a first leg of the clip;
applying a force greater than a selected threshold to the cover to slide a portion of the cover into a groove formed between the bonding member and a biased member of the attachment element, the biased member comprising a second leg of the clip;
receiving the portion of the cover within the groove; and
holding the portion of the cover in place within the groove by the biased member of the attachment element such that the trim member is attached to the cover in a manner that covers an edge of the stowage bin in which a bias of the biased member towards the bonding member prevents the portion of the cover held in place within the groove from moving without application of the force greater than the selected threshold.

* * * * *